United States Patent Office 3,566,439
Patented Mar. 2, 1971

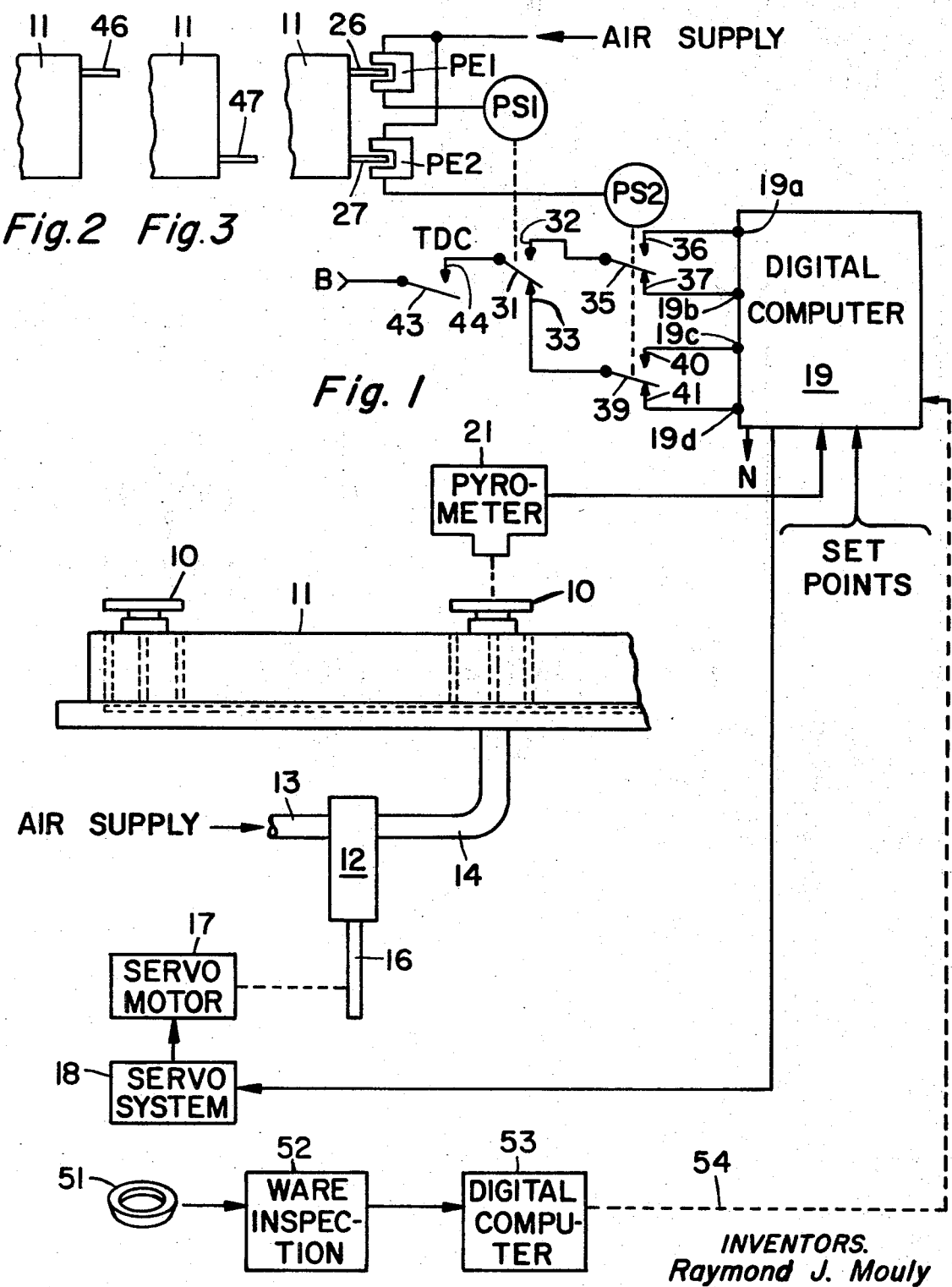

3,566,439
TEMPERATURE CONTROL SYSTEM FOR MOLDS
Raymond J. Mouly, Corning, and Robert L. Thomas, Painted Post, N.Y., assignors to Corning Glass Works, Corning, N.Y.
Filed Nov. 22, 1968, Ser. No. 778,280
Int. Cl. B29c 1/00; G01k 17/00
U.S. Cl. 18—4
2 Claims

ABSTRACT OF THE DISCLOSURE

A system for automatically sensing and controlling the temperature of each of a plurality of molds to within a desired temperature range therefor, each such mold being intermittently positioned at a station where cooling fluid supplied to each mold is adjusted in accordance with a programmed manipulation of a signal representing the sensed temperature of the respective mold and a set point signal representing the desired temperature for such mold.

BACKGROUND OF THE INVENTION

There is disclosed in Letters Patent of the United States, 3,071,967, issued Jan. 8, 1963 to R. J. Mouly, a temperature measuring system useful in measuring and controlling the temperature of molds in which articles are formed from a heated or molten material. FIG. 12 of such patent illustrates an automatic control system for adjusting the temperature of each of a plurality of molds, such as those mentioned, in accordance with the measured or sensed temperature of one of said plurality of molds. The description of the operation of the control system illustated in said FIG. 12 is covered in lines 17 through 49 of column 17 of said patent.

It has recently been recognized that the temperature of each of a plurality of molds being used to form similar articles from a heated or molten material should not necessarily be the same temperatures as any of the other molds of such plurality in order to produce ware or articles having similar characteristics such as shape and dimensions. Furthermore, each said mold may have cooling characteristics differing from those of the other molds of the plurality thereof and, therefore, require a different amount of cooling fluid to be supplied thereto in order to maintain it within its optimum temperature range for the ware or articles to be formed. It is therefore, readily apparent that automatically controlling the supply of cooling fluid to all of a plurality of molds in accordance with the sensing of the temperature of one mold of such plurality does not provide a type of automatic control system that is the most desirable possible. It is, accordingly, an object of the present invention to provide an automatic control system for controlling the temperature of each of a plurality of molds in accordance with the article-forming and cooling characteristics of each respective mold and the sensed temperature of each such mold following each forming operation performed thereby.

SUMMARY OF THE INVENTION

In accomplishing the above object of the invention there is provided a digital computer including a memory storing a set point signal representing a predetermined desired temperature for each mold of a plurality of molds used for forming articles or ware from a heated or molten material, a device such as a pyrometer for sensing the temperature of each of said plurality of molds as the respective mold is intermittently positioned at a selected location and for producing signals representative of the sensed temperatures, identification means for producing discrete signals representing or identifying each respective mold and supplying the signals to said computer, means in said computer controlled by said discrete signals for manipulating the sensed and set point signals for each respective mold and producing adjustment signals representative of any adjustment required in the amount of cooling fluid supplied to the respective mold, and a servosystem responsive to each adjustment signal for adjusting the supply of cooling fluid to the respective mold associated with the respective adjustment signal.

BRIEF DESCRIPTION OF THE DRAWINGS

The invention will best be understood with reference to the accompanying drawings wherein:

FIG. 1 is a schematic diagram of the sensing and control system embodying the invention and illustrates the identification of one mold of a plurality thereof;

FIG. 2 is a view illustrating a mold identification arrangement for another mold of said plurality thereof; and FIG. 3 is a view similar to FIG. 2 and illustrating the arrangement for identifying a third mold of said plurality of molds.

Similar reference characters refer to similar parts in each of the figures of the drawings.

PREFERRED EMBODIMENT OF THE INVENTION

Referring to the drawings in detail, there is shown in FIG. 1 an indexing or intermittently positioned press table 11 which carries a plurality of molds such as 10 which are successively and intermittently moved or indexed through a plurality of stations or positions including a mold charging station, a forming station, an article take-out station and one or more mold cooling stations. Table 11 may, for example, be the rotating table of a turret type glass-forming machine and, if a brief reference is made to said FIG. 12 of the aforementioned Mouly patent, the similarity between the apparatus, including table 11 and molds 10, to that shown in said FIG. 12 will be readily apparent.

A cooling fluid control valve 12 is provided in a manifold 13 which is connected to a suitable supply of cooling fluid such as compressed air, for example, and a fluid conduit 14 extends from the output side of valve 12 to the mold cooling station or position of table 11, and below such table so as to provide said cooling fluid to each mold intermittently positioned or indexed to the cooling station shown.

Valve 12 includes a stem 16 by rotation or similar adjustment of which the valve may be actuated to supply a greater or lesser amount of cooling fluid to conduit 14 and, thereby, to each mold such as 10. Stem 16 is connected through a suitable gear train included in a servomotor 17 which forms part of a servosystem 18. Servosystem 18 is adjusted to provide a zero voltage to servomotor 17 as long as a zero or other preselected signal is supplied to the servosystem from a digital computer 19 to be hereinafter discussed.

A temperature sensing device 21 is also provided at the previously mentioned mold cooling station or position. Such device may, for example, be a radiation pyrometer of any standard make. Pyrometer 21 detects the temperature of each mold indexed to or positioned at the mold cooling position or station and provides a discrete output signal representative of each such temperature. Each such output signal is supplied as an input to computer 19.

As is obvious, press table 11 may carry any practicable number of molds but for purposes of simplification of the description of the apparatus, it will be assumed that press table 11 carries only four molds such as 10. Such table is, therefore, intermittently moved or indexed between four stations or positions, such positions comprising a mold charging position, a press forming position, an article or ware take-out position, and a mold cooling position where pyrometer 21 is located to sense the temperature of each mold stationed at such position and where conduit 14 is located to supply cooling fluid to each such mold. A discrete binary code is employed to identify each mold positioned at the mold cooling position and, since it is assumed for discussion purposes that table 11 carries only four molds such as 10, a two-bit binary code is sufficient to identify each of the four molds as discussed below.

There is illustrated at the top of FIG. 1 a section of press table 11 having tabs 26 and 27 extending outwardly from the outer periphery of the table adjacent the top and bottom surfaces of the table, respectively. There is also shown a pair of generally U-shaped tab detection devices which are designated PE1 and PE2 and are mounted one above the other near the outer periphery of press table 11. Detection devices PE1 and PE2 are pneumatically controlled devices and each may, for example, be a so-called pneumatic eye such as the Moore Pneumatic Eye, Part #9700–10, which is manufactured and sold by Moore Products Company, Philadelphia, Pa. The input ports of pneumatic eyes PE1 and PE2 are connected to a suitable source of compressed air supply and the output ports of such eyes are connected to the input ports of pressure switches PS1 and PS2, respectively. Pressure switches PS1, and PS2 may each be, for example, a switch such as Model or Part No. 4414–12 also manufactured by the above-named company.

Pneumatic eyes such as PE1 and PE2, and the pressure switches such as PS1 and PS2 are components of a well-known type whose modes of operation are also well known. However, for the purpose of making the description complete it is pointed out that switch PS1 actuates a movable electric circuit controlling contact 31 which is closed against a fixed contact point 32 when the channel or air gap in pneumatic eye PE1 is clear, that is, not occupied by an object such as tab 26. However, when such channel or air gap is occupied as by a tab such as 26, switch PS1 is actuated to close movable contact 31 against fixed contact point 33 as shown in the drawing. Similarly switch PS2 actuates movable electric circuit controlling contacts 35 and 39 which are closed against fixed contact points 36 and 40, respectively, or fixed contact points 37 and 41, respectively, accordingly as the channel or air gap in pneumatic eye PE2 is clear or occupied, respectively. When, therefore, the channel or air gap in pneumatic eye PE2 is occupied as by a tab such as 27, switch PS2 is actuated to close movable contacts 35 and 39 against fixed contact points 37 and 41, respectively, as shown in the drawings.

Each of the previously mentioned four molds such as 10 carried by press table 11 is assigned one of the four discrete binary code identification signals 00, 01, 10 and 11 as also previously mentioned. The mold such as 10 shown stationed or positioned at the mold cooling station in FIG. 1 is assigned the binary code 11. At such time tabs 26 and 27 are, as shown at the top of FIG. 1, occupying the air gaps or channels of pneumatic eyes PE1 and PE2 and, therefore, the closing of an electric circuit to mold identification terminal 19d (binary code 11) of digital computer is prepared. Following the stationing of said mold 10 at the mold cooling station or position, the movable portion 43 of an electric circuit controlling contact TDC is actuated to close against the fixed contact point 44 of contact TDC, and the circuit to said terminal 19d of computer 19 is completed. Contact TDC is a contact on a conventional timing drum such as usually employed to control the sequence of operations of glass forming machinery.

There is shown in FIGS. 2 and 3, sections of mold table 11 having extending upper and lower tabs 46 and 47, respectively. Such tabs serve to identify second and third ones of the molds 10 which are assigned the binary codes 01 and 10, respectively. When the fourth mold is positioned or stationed at the mold cooling station, no tabs are located so as to occupy the channels or air gaps of pneumatic eyes PE1 and PE2, and a circuit is prepared for energizing mold identification terminal 19a of digital computer 19, such circuit being completed when contact TDC on the previously mentioned timing drum closes upon completion of the movement by table 11 of the fourth mold to the mold cooling position. Movable contacts 31 and 35 of switches PS1 and PS2 are, of course, closed against fixed contact points 32 and 36 whenever the molds such as 10 are being indexed or moved between the stations mentioned but electrical energy is not supplied to mold identification terminal 19a of digital computer 19 at such time because contact TDC is open during such movement or indexing of the molds.

It is pointed out that a source of electrical current of suitable voltage and capacity is provided for energization of the electrical apparatus such as the digital computer 19 but such source is not shown in the drawings for purposes of simplification thereof. However, the positive and negative terminals of said current source are designated B and N, respectively.

A set point signal representing a desired temperature for each individual mold is manually supplied to digital computer 19, such signals being stored in the memory of the computer. Such computer is programmed to produce signals representative of any necessary adjustments in valve 12 to increase or decrease the supply of cooling fluid or air to each individual mold stationed at the mold cooling position. Each such signal is an adjustment signal produced by computer 19 manipulating the stored and sensed signals for each respective mold in accordance with the programming of the computer. Such adjustment signals are supplied to servosystem 18 to cause adjustment of valve 12 in accordance with any adjustments required therein for proper cooling of the molds stationed at the cooling position, as previously mentioned.

When press table 11 moves so that the mold 10 identified by binary code 01 is at the cooling station, tab 46 will occupy the air gap of pneumatic eye PE1 and, upon contact TDC closing, an electric circuit to terminal 19c of computer 19 will be closed. Similarly, when table 11 moves so that the mold 10 identified by binary code 10 (one-zero) is at the cooling station, tab 47 will occupy the air gap of pneumatic eye PE2 and, upon contact TDC closing, an electric circuit to terminal 19b of computer 19 will be closed. This will be readily apparent to those skilled in the switching circuit art.

The energization of each identification terminal 19a, 19b, 19c or 19d of computer 19 will actuate the computer to associate the sensed signal supplied thereto from pyrometer 21 with the stored set point signal for the mold then at the cooling station and manipulate such signals to produce an adjustment signal representative of any necessary adjustment of valve 12 to supply the proper amount of cooling air to said mold to cool it to its selected desired temperature as represented by the pre-determined set point signal for such mold stored in the computer.

In an extension or modification of the basic control system described, an automatic set point adjustment system such as illustrated at the lower part of FIG. 1 may be provided. In such modification, articles or pieces of ware such as 51 formed in the molds such as 10 may be periodically selected and manually or automatically inspected as to desired dimensions and shape as by ware inspection apparatus 52. Each so selected article or piece of ware is identified with the mold in which it is formed and such identification and information relating to deviations in the respective article from desired parameters therefor are supplied to another digital computer 53. Such computer is programmed to compute any adjustments necessary in the set point signals stored in computer 19 for each respective mold and produce signals representing such necessary adjustments. Each such adjustment signal and the identification for the mold in which the respectively associated article or piece of ware was formed is supplied over a cable, indicated by the dotted line 54, to computer 19. Each such adjustment signal is then associated in computer 19 with the set point signal for the identified mold and such set point signal is adjusted in accordance with the computation made by computer 53 for such mold.

As previously mentioned press table 11 may carry more than four molds and, in such event, the mold cooling apparatus and control system may be located at any of the stations subsequent to the take-out station or position and prior to the mold charging position. Furthermore, such an apparatus and control system can, if found desirable and expedient to do so, be located at more than one of such stations subsequent to the take-out station.

Although there is herein shown and described only one form of apparatus embodying the invention, it will be understood that various changes and further modifications may be made therein within the purview of the appended claims without departing from the spirit and scope thereof.

We claim:

1. In combination with a machine for forming articles from heated or molten material and which intermittently positions each of a plurality of article forming molds at a plurality of stations including material charging, article forming, article take-out and mold cooling stations, a mold temperature control system comprising;
   (A) adjustable means at a station subsequent to said take-out station for supplying cooling fluid to each said mold positioned at such subsequent station,
   (B) means for sensing the temperature of each said mold positioned at said subsequent station and producing signals representative of each respective mold temperature,
   (C) means for producing identification signals for each respective mold arriving at said subsequent station,
   (D) a digital computer including a memory storing signals representative of a desired temperature for each respective mold,
   (E) means controlled by said identification signals for activating said computer to manipulate the sensed and stored signals for each respective mold arriving at said subsequent station to produce an adjustment signal representative of any adjustment required in said cooling fluid supply means for cooling the respective mold to its desired temperature, and
   (F) means responsive to each said adjustment signal for adjusting said cooling fluid supply means in accordance with the value of the respective adjustment signal.

2. Apparatus in accordance with claim 1 and further including means for gaging selected ones of said articles and producing signals representative of any deviations in the respectively gaged articles from desired parameters therefor, such deviation signals being supplied to said computer for adjusting the stored signals for the molds in which the respectively gaged articles were formed and thereby prevent subsequent similar deviations in articles formed in the respective molds.

References Cited
UNITED STATES PATENTS

| | | | |
|---|---|---|---|
| 2,721,729 | 10/1955 | Van Riper | 18—12X |
| 2,760,046 | 8/1956 | Rothacker | 18—12X |
| 3,071,967 | 1/1963 | Mouly | 73—355X |
| 3,286,302 | 11/1966 | Doering | 18—2 |

OTHER REFERENCES

Modern Plastics October 1968 (pp. 122–124 and 126) Article by Robert Currie.

J. SPENCER OVERHOLSER, Primary Examiner

R. L. SPICER, JR. Assistant Examiner